Jan. 12, 1960
A. R. ZIPF
2,921,300
ELECTRONIC SELECTOR
Filed Nov. 8, 1954
5 Sheets-Sheet 3
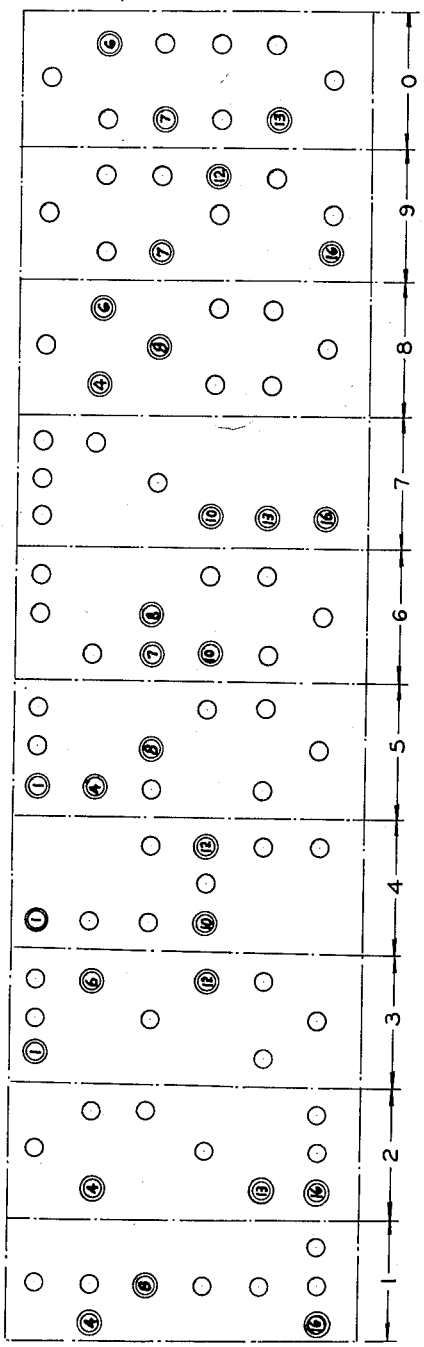
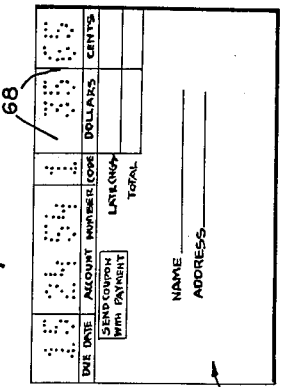
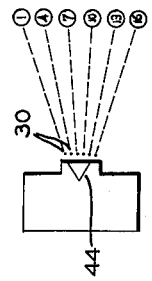
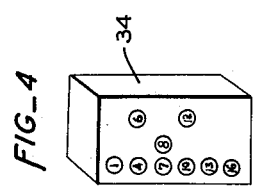
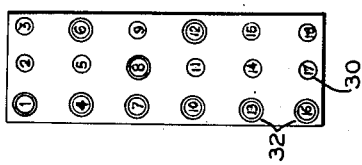
INVENTOR.
ALFRED R. ZIPF
BY
Boyken, Mohler + Wood
ATTORNEYS Jan. 12, 1960 A. R. ZIPF 2,921,300
ELECTRONIC SELECTOR
Filed Nov. 8, 1954 5 Sheets-Sheet 4
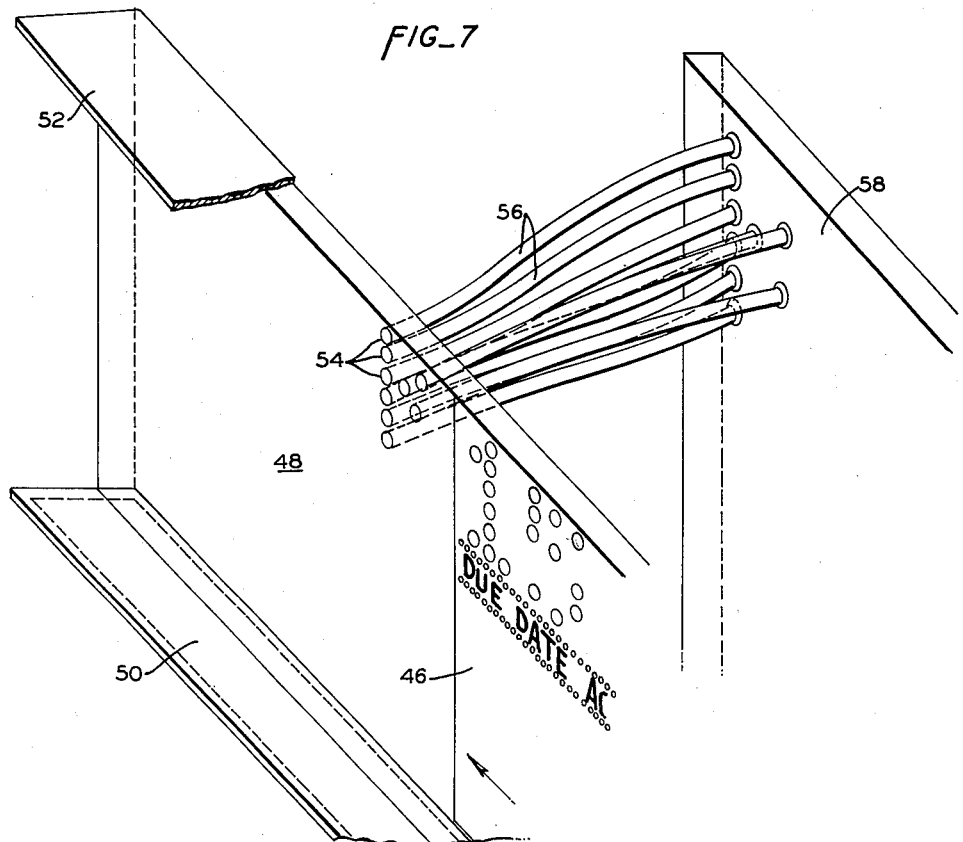
FIG_7
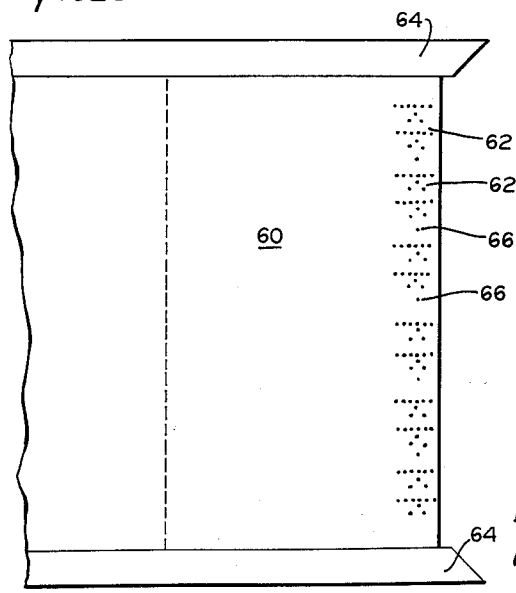
FIG_8
INVENTOR.
ALFRED R. ZIPF
BY
ATTORNEYS Jan. 12, 1960
A. R. ZIPF
2,921,300
ELECTRONIC SELECTOR
Filed Nov. 8, 1954
5 Sheets-Sheet 5
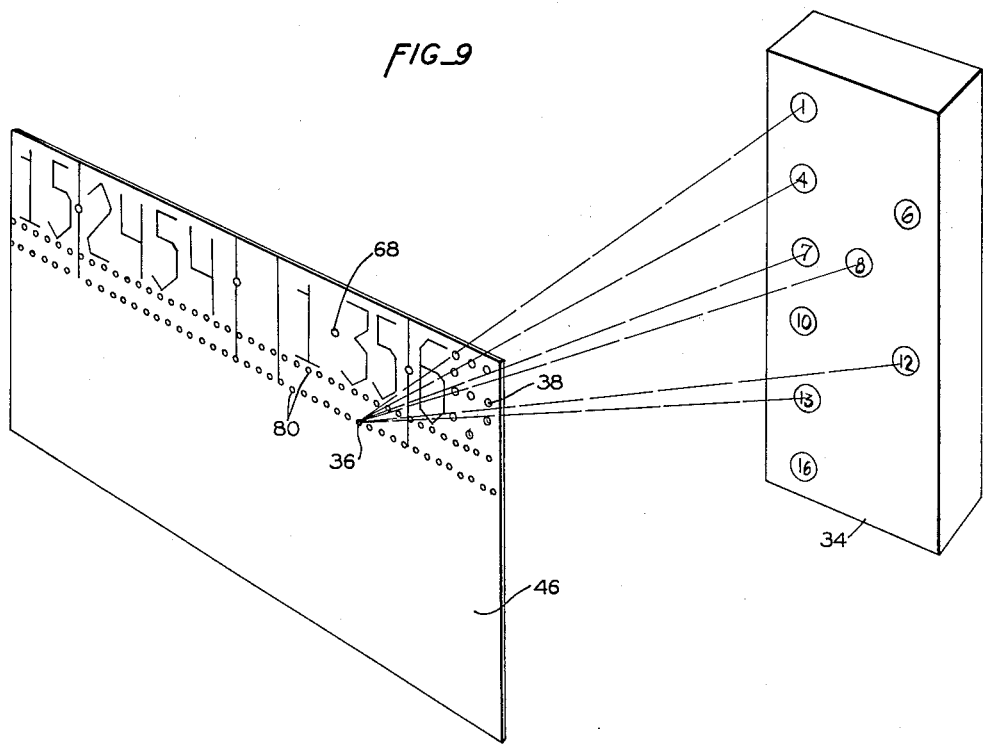
FIG_9
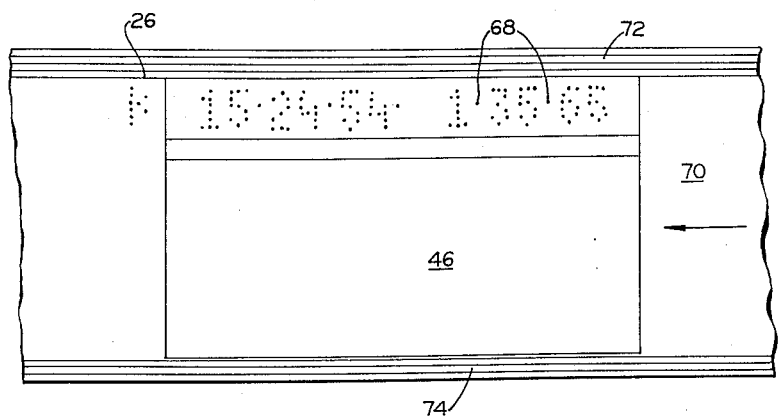
FIG_10
INVENTOR.
ALFRED R. ZIPF
BY
Boyken, Mohler & Wood
ATTORNEYS United States Patent Office 2,921,300
Patented Jan. 12, 1960

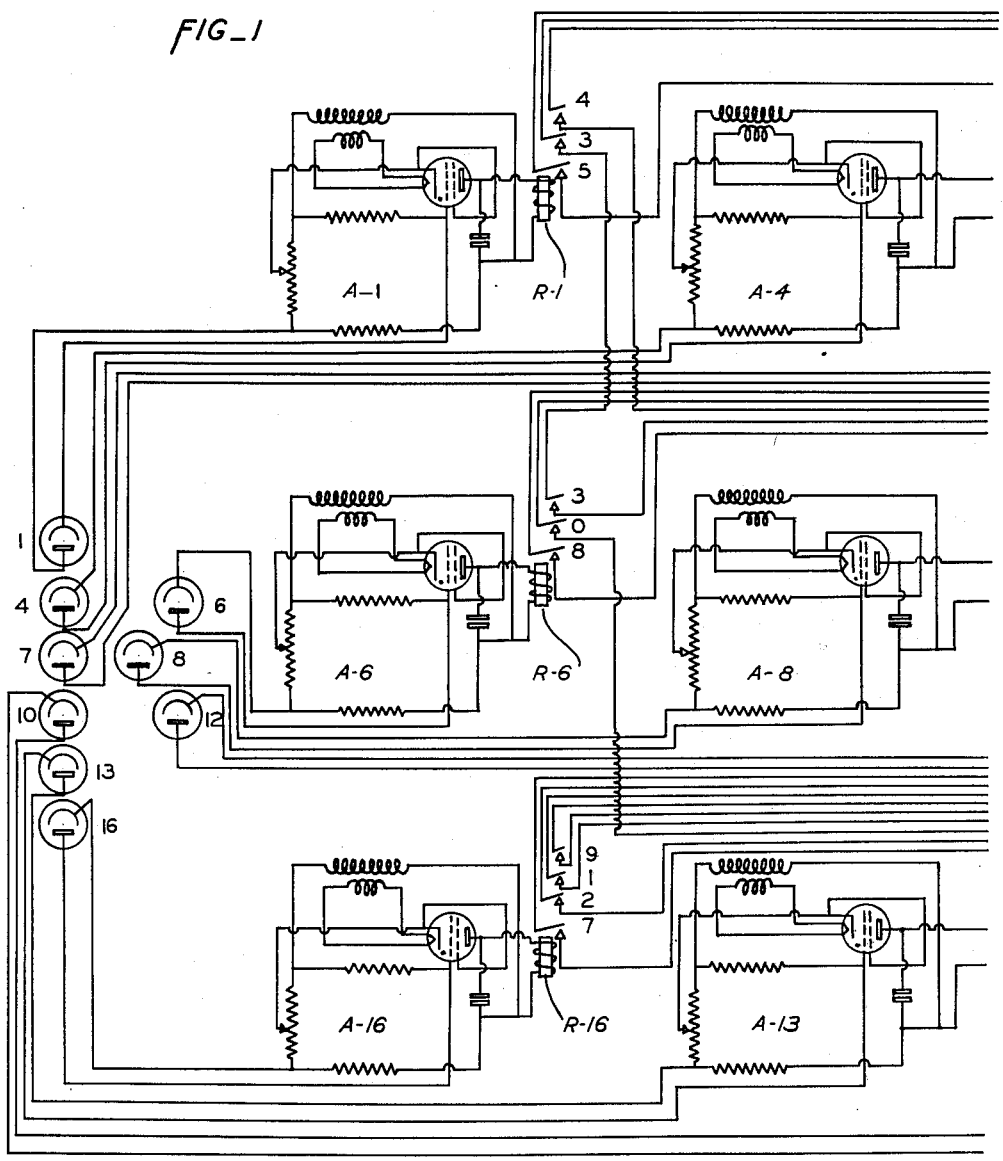
FIG_1

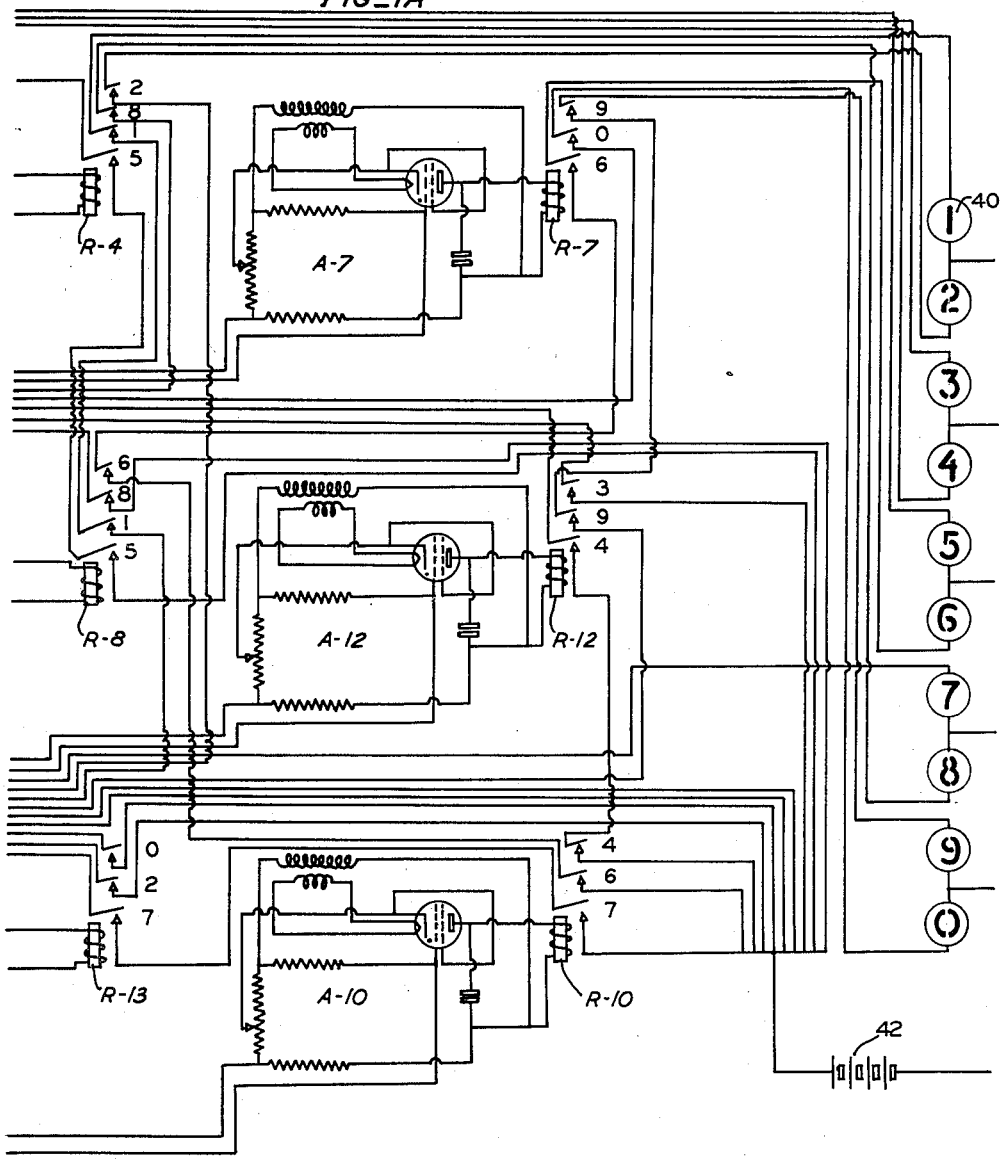

2,921,300

ELECTRONIC SELECTOR

Alfred R. Zipf, Van Nuys, Calif., assignor, by mesne assignments, to Cummins-Chicago Corporation, Chicago, Ill.

Application November 8, 1954, Serial No. 467,325

5 Claims. (Cl. 340—324)

This invention relates to an electronic selector, and more particularly to a novel device for identifying perforated characters automatically by a signalling means employed to operate other automatic or semiautomatic devices, thus eliminating visual reading or manual operation.

Various certificates, cards, checks and the like are provided with perforated indicia which describe numbers or letters through the selection of a distinctive arrangement of perforations for each number or letter from a total field of eighteen or twenty-four possible perforations necessary to describe all numbers or letters. In the description of the invention, a total field of eighteen perforations for describing the numbers from one to zero has been chosen. In practice, the field of perforations is used to identify or distinctively mark, in perforated characters, a number of documents simultaneously. The invention features means for automatically sorting and reading these characters, thus eliminating the necessity of visually reading the certificates and the manual sorting thereof.

One of the features of the preferred form of the invention lies in the utilization of an arrangement of light sensitive cells so designed and positioned whereby light rays passing through the perforations will excite a selected number of the light sensitive cells so that suitable relays are actuated through amplifiers to complete an operative electrical circuit to an indicator mechanism or other automatic or semiautomatic device which can be utilized to either count or otherwise operate, based upon the signal input thereto.

Still further objects and features of this invention reside in the provision of a novel electronic sorter which is simple in construction, capable of being utilized to automatically identify and sort various types of certificates and the like, which is highly efficient in operation, and which will severely reduce the amount of labor necessary in the sorting of perforated documents.

These, together with the various ancillary objects and features of the invention which will become apparent as the following description proceeds, are attained by this electronic selector, preferred embodiments of which having been illustrated in the accompanying drawings by way of example only, wherein:

Figures 1 and 1-A form a schematic diagram of the major electrical and electronic components of the invention;

Figure 2 is a diagrammatic view of the field of perforations or die block utilized to form the various different perforated numerals;

Figure 3 is a schematic diagram illustrating in particular the perforations utilized to form each of the different numerals from "zero" to "nine" and illustrating the special perforations which are solely characteristic of each individual numeral and which are provided for activating certain suitably positioned light sensitive cells;

Figure 4 is a diagram showing the position of the nine selected light sensitive cells, showing their arrangement in a suitable mounting block for selective excitation;

Figure 5 shows an arrangement of the relative positioning of a light source and the individual photocells so that light rays may be directed through the perforations and onto the photocells;

Figure 6 illustrates a typical document to be identified through the use of this electronic selector;

Figure 7 is a perspective view illustrating schematically the manner in which Lucite rods may be utilized and may extend between perforations in a table over which the certificates pass and the individual light sensitive cells;

Figure 8 is a plan view illustrating an arrangement whereby all of the different perforated numerals on an individual certificate may be read simultaneously;

Figure 9 is a perspective schematic illustration showing the light source, certificate and the manner in which the light rays pass through the perforated numerals and onto the various individual light sensitive cells; and Figure 10 is a schematic plan view illustrating the manner in which a perforated certificate may be passed over a single reading station for successive reading of the individual perforated numerals of a certificate.

With continuing reference to the accompanying drawings wherein like reference numerals designate similar parts throughout the various views, and with particular attention initially to Figures 1 and 2, it will be noted that in Figure 2 there is disclosed a field, including eighteen perforation stations, which is used to describe various numerals from zero to nine. Each of the perforations is generally designated by reference numeral 30, and it is noted that nine of the eighteen holes which are shown with double rings for clarity, and which are indicated by reference numeral 32, are shown to indicate the position of the nine photocells which may be mounted in a block, as at 34, and which are adapted to be selectively actuated to identify an individual numeral.

In Figure 3, there is disclosed schematically the various perforated numerals. It will be noted that there is shown, for each numeral, a group of three perforations which is unique to such numeral. For example, in the numeral "1," only the perforations in the positions 4, 8 and 16 are together, and in no other numeral is there provided this combination. Likewise, for the numeral "5," the perforation stations 1, 4 and 8 are used only in this perforated numeral and in no other. Thus, since each of these special combinations is also within the combination of the nine positions selected for the photocells, when a light beam passes through the perforations of a particular perforated numeral, a particular combination of photocells will be actuated. Thus, when light rays pass from a light source 36, as in Figure 9, through the various perforations of the perforated numeral "5" indicated at reference numeral 38, the light rays will impinge upon the light sensitive cells 1, 4, 7, 8, 12 and 13. However, the combination 1, 4 and 8 is contained within the total of the light cells which are actuated, and thus, by means of the electronic circuit shown in Figures 1 and 1-A, the signals from the photocells 7, 12 and 13 will be discarded, and an indicator mechanism corresponding to the perforated numeral "5" will be excited.

As is shown in Figure 1, the various photocells which are numbered in accordance with their position in the field are each individually connected to the amplifiers designated by A with a sub-number corresponding to the position of the particular photocell to which it is connected. The amplifiers are conventional vacuum tube circuits, and serve to actuate the single-throw, multi-pole relays designated by R with a sub-number corresponding to the particular amplifier and the particular photocell with which it is connected.

The various poles of each of the relays R are connected to the various numbered indicators or actuation mechanisms 40, as can be seen in Figure 1-A. Thus, when the light rays pass through the perforations 38 forming the numeral "5," and the photocells 1, 4, 7, 8, 12 and 13 are excited, the relays $R_1$, $R_4$, $R_7$, $R_8$, $R_{12}$ and $R_{13}$ will be closed. However, the closing of all of these relays will only serve to complete an operative electrical circuit from the source of electrical power, as at 42, to the individual actuation mechanism 40 corresponding to the numeral "5," due to the fact that the circuits to the other actuation mechanism will remain open because all of the poles of the relays necessary to complete the circuit to these individual actuation mechanisms 40 will not be in closed circuit position.

In other words, the photocells 1, 4 and 8 in combination "identify" numeral "5" and the corresponding circuit is completed through relays $R_1$, $R_4$ and $R_8$.

Considering the example of the numeral "5" in detail, the operation of the circuit is as follows: Photocells 1, 4, 7, 8, 12 and 13 are energized by the light rays formed by numeral "5" as shown in Fig. 9. In addition to actuation of amplifiers $A_1$, $A_4$ and $A_8$ corresponding to the numeral "5," amplifiers $A_7$, $A_{12}$, and $A_{13}$, are also actuated.

Amplifier $A_1$ acting through relay $R_7$ closes the bank of switches 9, 0 and 6 (Fig. 1-A). Since switch 9 associated with relay $R_{12}$ is also closed by actuation of energized amplifier $A_{12}$, a circuit is completed through both switches. However, since switch 9 associated with relay $R_{16}$ is not closed because amplifier $A_{16}$ is not actuated, this particular circuit is not completed and the actuation mechanism 40 corresponding to numeral "9" is not energized.

Similarly, the circuit that includes the switch 0 that is actuated by amplifier $A_7$ cannot be completed to actuate the mechanism 40 corresponding to numeral "0" because its circuit includes the switch 0 associated with relay $R_6$ which is not actuated because amplifier $A_6$ is not actuated by light beams through the numeral "5."

In like manner, no circuit can be completed by closing switch 6 of relay $R_7$ because the switch 6 circuit includes the switch 6 associated with relay $R_{10}$ which is not energized.

From the above, it follows that the actuation of relay $R_7$ by reason of a light beam impinging on its corresponding photocell has no effect insofar as completing a circuit is concerned.

Similarly, it will be seen from an inspection of Figs. 1 and 1-A that actuation of amplifiers $A_7$, $A_{12}$, and $A_{13}$ by perforated numeral "5" does not result in any circuits being completed.

The manner in which actuation of amplifiers $A_1$, $A_4$ and $A_8$ results in completion of operative circuits will now be described.

Referring now to the switches 4 and their corresponding relays, it is seen that a circuit cannot be completed to the actuator corresponding to numeral "4" because said circuit includes the relay $R_{10}$ which has not been actuated. In like manner no circuit can be completed through the switches 0, 1, 2, 3, 4, 6, 8, one or more of which are actuated by energizing amplifiers $A_1$, $A_4$, and $A_8$ corresponding to the numeral "5."

However, it will be seen from Figs. 1 and 1-A that the actuator 40 corresponding to the numeral "5" is in the circuit of switches 5 closed by relays $R_1$, $R_4$ and $R_8$ which in turn are actuated by amplifiers $A_1$, $A_4$ and $A_8$ respectively. In other words, the circuit through the "5" actuator is the only one completed when light beams impinge on photocells 1, 4, 7, 8, 12 and 13 as a result of the presence of the perforated numeral "5."

From the above description it is seen that the method involved is to establish three signal responsive elements unique to each numeral so that a circuit is completed through each element in such a manner as to actuate only that actuator identified with the particular numeral.

In Figure 4, there is shown a block 34 of plastic or the like in which the various photocells may be suitably embedded in the arrangement as is shown. Figure 5 shows the relative position of the light source 44 with respect to the perforations 30 and the various light sensitive cells. It is noted that the light cells should be positioned immediately adjacent the perforations when compared with the distance between the perforations and the light sensitive cells.

In Figure 6, there is shown a certificate in which various important indicia is indicated by perforated initials which must be identified so that the information contained on the perforated cards may be readily interpreted. For example, if it is desired to determine the total amount of accounts due and the perforated numerals in the dollars and cents portion of the cards 46 contain this information, the mechanism connected with this electronic selector can be adjusted to totalize the amount of the figures in these respective portions of the certificate when the plurality of certificates are successively fed into a machine employing the concepts of the present invention.

The certificate 46 can be identified by passing along a highly polished table 48 between guides 50 and 52. It is noted that the table 48 is provided with suitable perforations, as at 54, and tubes 56 constructed from Lucite or other suitable light transmitting transparent material interconnects the apertures 54 with the photocells which may be arranged in a suitable mounting block 58. In this manner, the larger spacing necessary for the photocells which are mounted in the block 58 will not adversely affect the operation of the device due to the fact that light passing from a suitable light source through the perforations in the certificate 46 will be carried by the Lucite tubes 56 to the various photocells in the mounting block 58.

In Figure 8, there is shown a modified form of the invention in which there is provided a table 60 having a plurality of sets of photocells, as at 62, arranged thereon between suitable guides, as at 64. There is also provided at least a pair of suitable light sensitive cells 66 which are adapted to be excited by light beams passing through aligned perforations 68 formed in the certificate 46. Hence, the signal imparted by the light sensitive cells 66 will serve to actuate the mechanism of the electronic circuit of the invention utilizing any suitable relay mechanism (not shown).

It is to be recognized that the mechanism shown schematically in Figure 8 is utilized for simultaneously reading all of the perforated initials on a single certificate. However, there is shown in Figure 10 a modified form of the invention in which the certificate 46 is fed along a table 70 by any suitable mechanism between spaced guides 72 and 74. Two of the spacer holes 68 in the certificate may be used as sprocket holes to maintain alignment of the certificate 46, or two photocells in series connection before the reading station, generally designated at 76, may be energized by a suitable light source (not shown) through the spacer holes 68 to prevent the reading of the certificate 46 if the certificate is not properly positioned. In the form of the invention as shown in Figure 10, the individual perforated numerals are successively identified.

In lieu of the photocells for actuating the relay means of the electronic circuit, mechanical fingers can be utilized in a separate form of the invention for identifying the individual perforated numerals.

As seen in Figure 9, a suitable series of one or more rows of sprocket holes 80 may be provided on the certificate 46 for providing means for alignment and propelling the certificate.

It will be understood that the success of the present invention depends, to a large extent, on the provision of a relatively small number of photocells. In other words the number of light responsive elements is relatively small (nine) compared to the total number of perforation stations (eighteen). In this connection, it facilitates an understanding of the invention and claims, to consider all of the possible perforations as being made at perforation stations in a field of eighteen or twenty-four stations.

Referring again to Figure 3 it will be noted that for each numeral from "zero" to "nine" inclusive there are three perforation stations unique to each numeral. In other words, the combination of stations 4, 8, 16 occurs only in numeral "one," the combination of 4, 13, 16 occurs only in numeral "two," and so on.

If it is desired to employ a field having twenty-four perforation stations it will be understood that the method of carrying out the invention will be the same; that is, a relatively small group of perforation stations unique to each numeral is established so that a larger number of light responsive elements may be arranged to include all of the groups of light responsive elements corresponding to the groups of perforation stations.

The present disclosure represents only one arrangement by which the method of the present invention may be carried out. It should therefore be understood that the present invention contemplates a method which may be carried out with letters as well as numerals or for any other indicia. The method which is initiated by determining a numerically small group of perforation stations unique to each indicia will remain the same.

From the foregoing, the construction and operation of the device will be readily apparent and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. Apparatus for reading one of ten conventional, visually identifiable numerals from "zero" to "nine" inclusive defined by selected perforations on a sheet having eighteen perforation stations comprising: means for projecting light rays through said selected perforations, nine light responsive elements respectively adapted to be impinged upon by the light rays passing through corresponding perforations of said eighteen perforation stations, said nine elements including ten groups of three elements each with each of said groups respectively corresponding to three perforations which are unique to one of said numerals, ten independent actuators respectively corresponding to said ten numerals, means connecting said elements with said actuators for energizing only that actuator corresponding to the numeral of which the corresponding group of three elements are all impinged upon by said light.

2. Apparatus for reading one of a plurality of conventional, visually identifiable indicia respectively defined by selected perforations on a sheet having a relatively large number of perforation stations, comprising: means for passing a signal through all of said selected perforations, a plurality of signal responsive elements corresponding to certain only of said perforation stations and adapted to respond to signals through perforations corresponding to said certain stations, said certain stations including all of a plurality of numerically small groups of stations with each of said groups being unique to one only of said indicia, a plurality of actuators substantially less in number than the number of said stations, means connecting said elements with said actuators for energizing only that actuator corresponding to the indicia of which the corresponding group of elements all receive such signals.

3. In an apparatus for reading a conventional, visually understandable indicia formed on a sheet by selected perforations selected from a relatively large number of perforation stations: means for passing light through all perforations formed in said sheet, a plurality of light responsive elements corresponding to certain only of said perforation stations and respectively adapted to be actuated by the light passing through their corresponding perforations, a plurality of actuators respectively corresponding to said indicia and included in a plurality of electrical circuits for actuating said actuators, a plurality of switches arranged in series in each of said circuits, a plurality of switch closing means actuated respectively by said light responsive elements and adapted to close a group of switches of which each is contained in a different one of said circuits, said certain only stations including all of a plurality of numerically small groups of stations with each of said groups being unique to one only of said indicia, whereby only the actuator circuit in which all switches are closed by said switch closing means corresponding to said indicia is completed to actuate the associated actuator.

4. In an apparatus for reading a conventional, visually understandable indicia formed on a sheet by selected perforations selected from a relatively large number of perforation stations: means for passing light through all perforations formed in said sheet, a plurality of light responsive elements corresponding to certain only of said perforation stations and respectively adapted to be actuated by the light passing through their corresponding perforations, a plurality of actuators respectively corresponding to said indicia and included in a plurality of electrical circuits for actuating said actuators, a plurality of switches arranged in series in each of said circuits, a plurality of switch closing means actuated respectively by said light responsive elements and adapted to close a group of switches of which each is contained in a different one of said circuits, said certain only stations including all of a plurality of numerically small groups of stations with each of said groups being unique to one only of said indicia, whereby only the actuator circuit in which all switches are closed by said switch closing means corresponding to said indicia is completed to actuate the associated actuator, the switch closing means corresponding to one perforation of the small group that is unique to one indicia acting to close a switch in each of the circuits of the actuators corresponding to the other indicia of which the unique group contains said one perforation.

5. Apparatus for reading one of a plurality of conventional, visually identifiable indicia respectively defined by selected perforations on a sheet having a relatively large number of perforation stations, comprising: means for passing a signal through all of said selected perforations, a plurality of signal responsive elements corresponding to certain only of said perforation stations and adapted to respond to signals through perforations at said certain stations, said certain stations including all of a plurality of numerically small groups of stations with each of said groups being unique to one only of said indicia, a plurality of actuators substantially less in number than the number of said stations, means connecting said elements with said actuators for energizing only that actuator corresponding to the numeral of which the corresponding group of elements all receive such signals, said last mentioned means comprising a separate electrical circuit for energizing each of said actuators, each of said circuits containing a plurality of switches in series, said switches being arranged whereby an element responding to a signal through one perforation closes a switch in all other actuator circuits corresponding to all other indicia of which the unique group contains said one perforation.

References Cited in the file of this patent

UNITED STATES PATENTS

| | | |
|---|---|---|
| 2,000,403 | Maul | May 7, 1935 |
| 2,124,906 | Bryce | July 26, 1938 |
| 2,143,875 | Hansell | Jan. 17, 1939 |
| 2,266,779 | Loughridge | Dec. 23, 1941 |
| 2,285,296 | Maul | June 2, 1942 |
| 2,302,081 | Weitmann | Nov. 17, 1942 |
| 2,382,251 | Parker et al. | Aug. 14, 1945 |
| 2,518,694 | Jannopoulo | Aug. 15, 1950 |
| 2,682,043 | Fitch | June 22, 1954 |
| 2,723,308 | Vroom | Nov. 8, 1955 |
| 2,759,045 | Young | Aug. 14, 1956 |
| 2,794,977 | Stoodart | June 4, 1957 |